(12) United States Patent
Watanabe (10) Patent No.: US 10,894,324 B2
(45) Date of Patent: Jan. 19, 2021

(54) INFORMATION PROCESSING APPARATUS, MEASURING APPARATUS, SYSTEM, INTERFERENCE DETERMINATION METHOD, AND ARTICLE MANUFACTURING METHOD

(71) Applicant: CANON KABUSHIKI KAISHA, Tokyo (JP)

(72) Inventor: Daisuke Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 15/945,810

(22) Filed: Apr. 5, 2018

(65) Prior Publication Data
US 2018/0290307 A1    Oct. 11, 2018

(30) Foreign Application Priority Data
Apr. 10, 2017   (JP) ................. 2017-077728

(51) Int. Cl.
*G06K 9/00* (2006.01)
*B25J 9/16* (2006.01)
(Continued)

(52) U.S. Cl.
CPC .......... *B25J 9/1697* (2013.01); *B25J 9/1612* (2013.01); *B25J 9/1666* (2013.01); *B25J 9/1676* (2013.01);
(Continued)

(58) Field of Classification Search
CPC .......... G06K 9/00201; G06K 9/00208; G06K 9/00214; G06K 9/00664; G06K 2209/19;
(Continued)

(56) References Cited

U.S. PATENT DOCUMENTS 7,171,041 B2    1/2007  Watanabe et al.
8,630,737 B2 *  1/2014  Oda ................. B25J 9/1697
                                                    700/245
(Continued)

FOREIGN PATENT DOCUMENTS

EP        1428634 A2    6/2004
JP     2002090113 A    3/2002
(Continued)

OTHER PUBLICATIONS

Extended European Search Report issued in European Appln No. 18166245.3 dated Sep. 20, 2018.

*Primary Examiner* — Eric Rush
(74) *Attorney, Agent, or Firm* — Rossi, Kimms & McDowell LLP (57) ABSTRACT

Accuracy in interference determination between a hand gripping a workpiece and nearby objects is increased. An information processing apparatus includes a measuring unit configured to decide an object to be gripped among a plurality of objects on the basis of a first image of the imaged objects, a specifying unit configured to specify an attention area for determining, when a gripping device grips the object to be gripped, whether the gripping device interferes with objects near the object to be gripped, a controller configured to change an imaging range of an imaging device on the basis of the attention area, and a determination unit configured to determine, when the gripping device grips the object to be gripped, whether the gripping device interferes with the objects near the object to be gripped on the basis of a second image of an object imaged in a changed imaging range.

12 Claims, 8 Drawing Sheets

(51) Int. Cl.
*B25J 13/08* (2006.01)
*G06T 7/00* (2017.01)
*G06T 1/00* (2006.01)
*G06T 7/70* (2017.01)

(52) U.S. Cl.
CPC ........ *B25J 13/089* (2013.01); *G06K 9/00201* (2013.01); *G06T 1/0014* (2013.01); *G06T 7/70* (2017.01); *G06T 7/97* (2017.01); *G05B 2219/39082* (2013.01); *G05B 2219/39083* (2013.01); *G05B 2219/39084* (2013.01); *G05B 2219/39393* (2013.01); *G05B 2219/40053* (2013.01); *G05B 2219/40613* (2013.01); *G06K 2209/19* (2013.01)

(58) Field of Classification Search
CPC ............ G06K 2209/21; G06K 2209/40; G06T 1/0014; G06T 7/0004; G06T 7/001; G06T 7/50; G06T 7/60; G06T 7/70; G06T 7/73; G06T 7/74; G06T 7/75; G06T 7/97; G06T 2207/30108; G06T 2207/30164; G06T 2207/30242; G06T 2207/30244; B25J 9/16; B25J 9/1612; B25J 9/163; B25J 9/1633; B25J 9/1653; B25J 9/1656; B25J 9/1664; B25J 9/1666; B25J 9/1669; B25J 9/1674; B25J 9/1676; B25J 9/1684; B25J 9/1694; B25J 9/1697; B25J 13/02; B25J 13/08; B25J 13/086; B25J 13/088; B25J 13/089; G05B 2219/39; G05B 2219/39001; G05B 2219/39011; G05B 2219/39013; G05B 2219/39028; G05B 2219/39029; G05B 2219/39031; G05B 2219/39039; G05B 2219/39082; G05B 2219/39083; G05B 2219/39084; G05B 2219/39088; G05B 2219/39091; G05B 2219/39094; G05B 2219/39106; G05B 2219/39108; G05B 2219/39393; G05B 2219/39466; G05B 2219/39473; G05B 2219/39474; G05B 2219/40; G05B 2219/40053; G05B 2219/40475; G05B 2219/40476; G05B 2219/40477; G05B 2219/40542; G05B 2219/40543; G05B 2219/40544; G05B 2219/40545; G05B 2219/40555; G05B 2219/40557; G05B 2219/40563; G05B 2219/40564; G05B 2219/40583; G05B 2219/40604; G05B 2219/40605; G05B 2219/40607; G05B 2219/40613; G05B 2219/40622

USPC ....... 382/100, 103, 106, 141, 151–154, 209, 382/216, 224, 282, 291, 325; 700/56, 57, 700/59, 61–64, 177, 178, 186, 192–194, 700/213, 245, 250, 251, 253, 254, 255, 700/258, 259; 901/1, 2, 8, 9, 14, 19, 30, 901/31, 35, 46, 47, 49, 50

See application file for complete search history.

(56) References Cited

U.S. PATENT DOCUMENTS

| | | | | |
|---|---|---|---|---|
| 8,788,095 | B2* | 7/2014 | Maehara | B25J 9/1679 |
| | | | | 700/258 |
| 9,132,546 | B2* | 9/2015 | Matsui | B25J 9/1612 |
| 9,132,548 | B2* | 9/2015 | Kamiya | B25J 9/1669 |
| 9,302,391 | B2* | 4/2016 | Iio | G06T 1/0014 |
| 9,616,572 | B2 | 4/2017 | Watanabe et al. | |
| 9,727,053 | B2* | 8/2017 | Ito | G05B 19/42 |
| 10,350,752 | B2* | 7/2019 | Satou | G06N 3/04 |
| 2002/0169522 | A1* | 11/2002 | Kanno | G05B 19/4061 |
| | | | | 700/245 |
| 2004/0122552 | A1* | 6/2004 | Ban | G06T 7/70 |
| | | | | 700/214 |
| 2004/0186624 | A1* | 9/2004 | Oda | B25J 9/1697 |
| | | | | 700/245 |
| 2005/0065653 | A1* | 3/2005 | Ban | B25J 9/1697 |
| | | | | 700/245 |
| 2008/0082213 | A1* | 4/2008 | Ban | G06T 7/73 |
| | | | | 700/260 |
| 2012/0029686 | A1 | 2/2012 | Ban et al. | |
| 2012/0165986 | A1* | 6/2012 | Fuhlbrigge | B25J 9/1687 |
| | | | | 382/153 |
| 2013/0116822 | A1* | 5/2013 | Atohira | G05B 19/4097 |
| | | | | 700/255 |
| 2013/0238128 | A1* | 9/2013 | Suzuki | B25J 9/1669 |
| | | | | 700/258 |
| 2014/0163737 | A1* | 6/2014 | Nagata | B25J 9/1697 |
| | | | | 700/259 |
| 2015/0003678 | A1* | 1/2015 | Watanabe | B25J 9/1697 |
| | | | | 382/103 |
| 2016/0229062 | A1* | 8/2016 | Suzuki | B25J 9/1697 |
| 2018/0250823 | A1* | 9/2018 | Shimodaira | B25J 9/1671 |

FOREIGN PATENT DOCUMENTS

| | | |
|---|---|---|
| JP | 2011093058 A | 5/2011 |
| JP | 2011235380 A | 11/2011 |
| JP | 2015009314 A | 1/2015 |
| JP | 2016099257 A | 5/2016 |

* cited by examiner

INFORMATION PROCESSING APPARATUS, MEASURING APPARATUS, SYSTEM, INTERFERENCE DETERMINATION METHOD, AND ARTICLE MANUFACTURING METHOD

BACKGROUND OF THE INVENTION

Field of the Invention

The present invention relates to an information processing apparatus, a measuring apparatus, a system, an interference determination method, and an article manufacturing method.

Description of the Related Art

In production lines such as factories and the like, a bulk picking technology in which one individual piece (one object) is recognized from bulk workpieces using a vision system and a robot hand performs gripping has been used in recent years. In this bulk picking, there is a technology for determining presence or absence of interference (collision) between nearby objects and a hand when a workpiece is gripped using distance information in advance (Japanese Patent Laid-Open No. 2015-9314).

There is a method of using a camera attached to a robot hand (hereinafter referred to as an on-hand camera) as a vision system for bulk picking. The on-hand camera may control a robot hand, and capture an image in an arbitrary position and posture. For this reason, this camera is often used to measure a relatively narrow area with high accuracy.

In a technology for recognizing a three-dimensional position and posture of a target object using an on-hand camera, there is a technology for performing recognition robustly and with high accuracy by performing two-stage imaging. For example, there is a technology for measuring a distance image using an on-hand camera and calculating an accurate position and posture of a target object after the imaging position and posture are decided such that concealment at the time of distance measurement decreases based on the position and posture of the target object estimated from a firstly captured image (Japanese Patent Laid-Open No. 2016-99257). Alternatively, there is a technology for measuring a distance image using an on-hand camera and calculates a position and a posture of the target object with high accuracy after setting the imaging position and posture on a straight line connecting the camera that captures the first image and a target object (Japanese Patent Laid-Open No. 2002-90113).

However, with regard to determination of presence or absence of interference when bulk workpieces are picked, the method of Japanese Patent Laid-Open No. 2015-9314 is based on the assumption that a determination area, that is, an area in which interference between a robot hand and nearby objects is of concern, is included within a measurement range of a camera. For this reason, if an area in which the bulk workpieces are present exceeds the measurement area of a camera, the presence or absence of interference in a place outside the measurement area is not known. On the other hand, in the methods of Japanese Patent Laid-Open No. 2016-99257 and Japanese Patent Laid-Open No. 2002-90113, an imaging position and posture for recognizing the position and posture of a workpiece with high accuracy are decided, and the presence or absence of interference is not considered a problem when the workpiece is gripped. For this reason, when bulk workpieces are picked using a camera that measures a relatively narrow visual field such as an on-hand camera, determination of the presence or absence of interference in an area exceeding the measured visual field is not performed.

SUMMARY OF THE INVENTION

The present invention aims, for example, to increase accuracy in interference determination between a hand gripping a workpiece and nearby objects.

An information processing apparatus according to one aspect of the present invention includes a decision unit configured to decide an object to be gripped among a plurality of objects on the basis of a first image of the imaged objects, a specifying unit configured to specify an attention area for determining, when a gripping device grips the object to be gripped, whether the gripping device interferes with objects near the object to be gripped, a change unit configured to change an imaging range of an imaging device on the basis of the attention area, and a determination unit configured to determine, when the gripping device grips the object to be gripped, whether the gripping device interferes with the objects near the object to be gripped on the basis of a second image of the objects imaged in a changed imaging range.

Further features of the present invention will become apparent from the following description of exemplary embodiments with reference to the attached drawings.

DESCRIPTION OF THE EMBODIMENTS

First Embodiment

Figure 1:
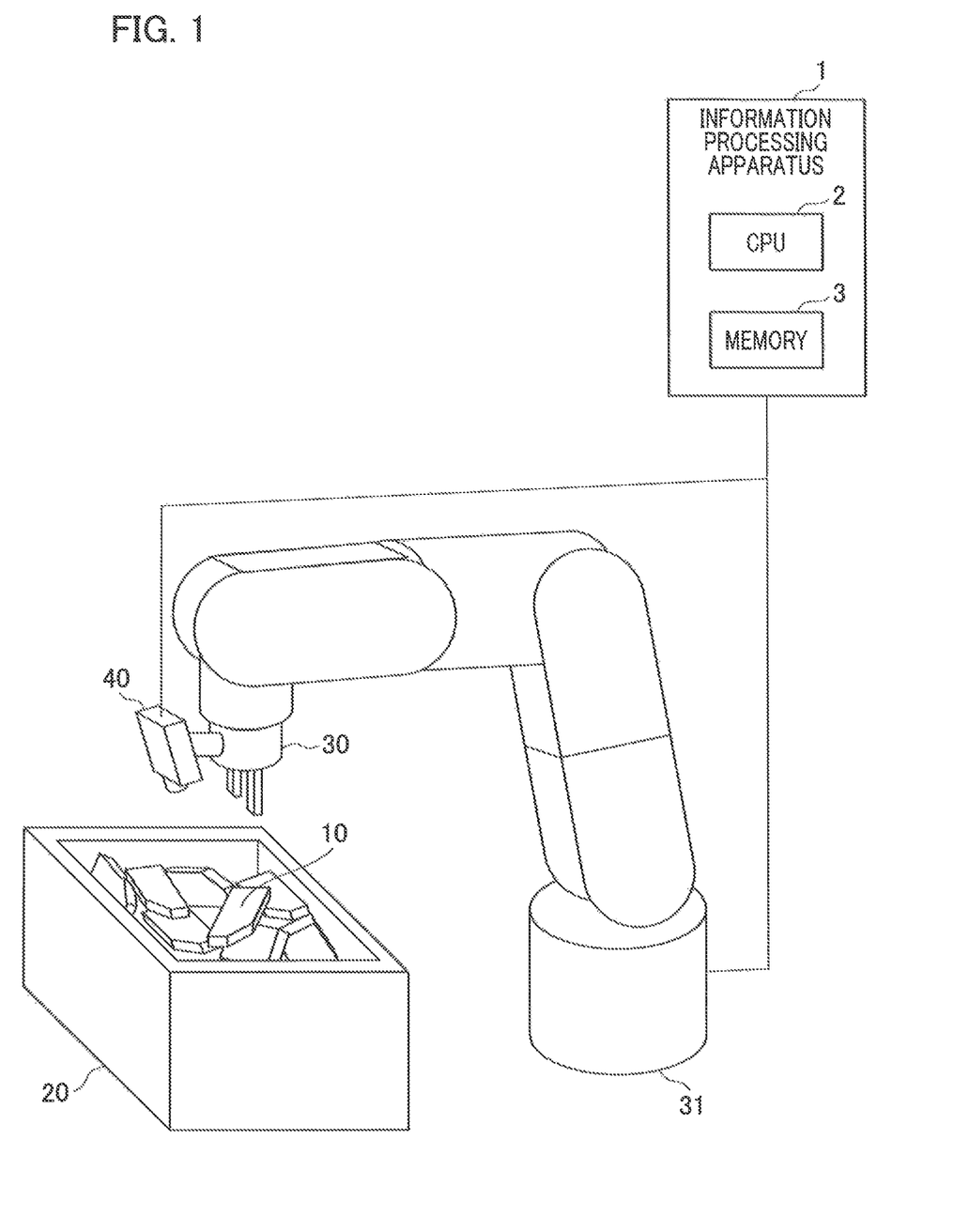
FIG. 1 is a diagram which shows the configuration of a picking system.

FIG. 1 is a diagram which shows a system for picking bulk workpieces. In the picking system, an imaging device 40 attached to a robot hand 30 images a bulk state of the workpieces 10 in a pallet 20, and performs picking by detecting one individual piece among the plurality of workpieces 10. The picking system includes an information processing apparatus 1, the imaging device 40, and a robot arm 31 and a robot hand 30 which are gripping devices.

The imaging device 40 is an on-hand camera which can be controlled to an arbitrary position and posture, and is mounted on the robot hand 30. The imaging device 40 can be controlled in an arbitrary position and posture by driving the robot arm 31 and the robot hand 30 which are articulated robots. The information processing apparatus 1 is a control center which performs operation control on the entire picking system, and includes a processor including a central processing unit (CPU) 2, a memory 3, and the like. The information processing apparatus 1 is connected to the imaging device 40 and the robot arm 31. The information processing apparatus 1 acquires an image captured by the imaging device 40, performs interference determination and the like between the robot hand 30 and nearby objects when measurement of the position and posture of the workpieces 10 and gripping of the workpieces 10 are performed on the basis of the image, and detects one of the workpieces 10 suitable for picking. The information processing apparatus 1 sends a drive command to the robot arm 31, and controls drive of the robot arm 31 and the robot hand 30 on the basis of information on the position and posture of the workpieces 10 which is a result of the measurement.

The robot hand 30 is attached to the tip of the robot arm 31, and is a gripping member which can grip (that is, pick) the workpieces 10 and cause it to translate or rotate. The robot hand 30 can manufacture an article constituted by a plurality of parts such as an electronic circuit board, a machine, or the like by assembling the workpieces 10 with other parts. In addition, it is possible to manufacture an article by processing the moved workpieces 10. Moreover, the shape of the robot hand 30 may be any shape as long as it has a function of holding the workpieces 10 such as gripping the workpieces 10, adsorbing the workpieces 10, and the like.

The workpieces 10 are loaded in bulk in the pallet 20. In the pallet 20, a space in which the workpieces 10 are stored exceeds an imaging range that the imaging device 40 captures in an image at one time, that is, a measurement range. Therefore, capturing an image is performed by controlling the robot arm 31 and moving the imaging device 40 to an arbitrary position and posture, and thereby detection of the workpieces 10 is performed. At this time, interference determination between the robot hand 30 and nearby objects when the workpieces 10 are gripped is also performed on an area not included in the image that is captured when the workpieces 10 are detected.

Figure 2:
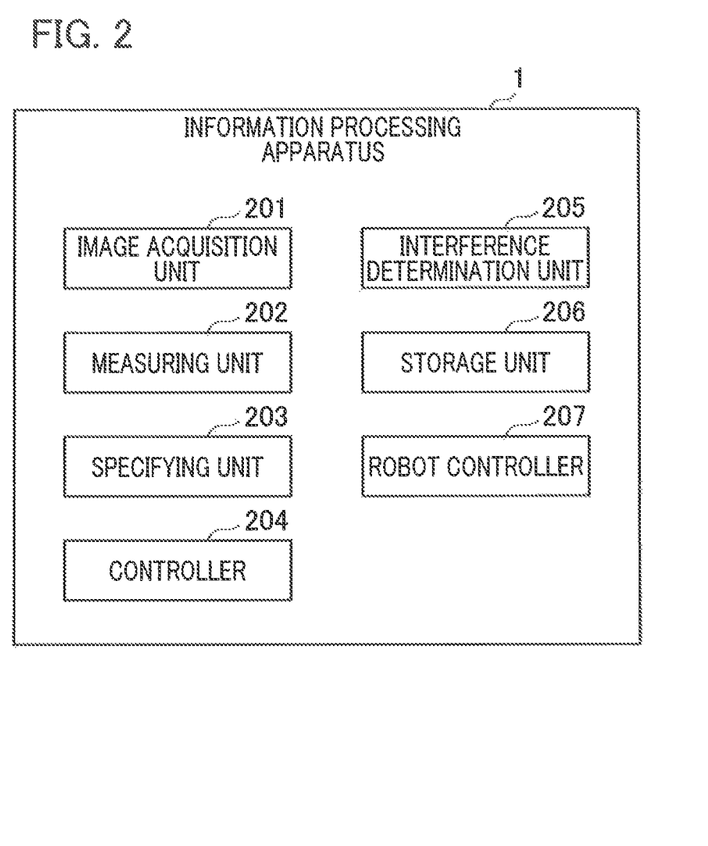
FIG. 2 is a diagram which shows the configuration of an information processing apparatus.

FIG. 2 shows the configuration of the information processing apparatus 1 according to the present embodiment. The information processing apparatus 1 includes an image acquisition unit 201, a measuring unit 202, a specifying unit 203, a controller 204, an interference determination unit 205, a storage unit 206, and a robot controller 207. Hereinafter, each unit constituting the information processing apparatus 1 will be described.

The image acquisition unit 201 acquires an image captured by the imaging device 40. The image acquisition unit 201 may acquire a distance image and a gray-scale image. The measuring unit 202 detects one individual piece among the plurality of workpieces 10 and calculates the position and posture thereof on the basis of the acquired image. Therefore, the measuring unit 202 functions as a decision unit for deciding one individual piece among the plurality of workpieces 10 and a measuring unit for measuring the position and posture thereof. A workpiece coordinate system and an imaging device coordinate system are set as unique coordinate systems for the workpiece 10 and the imaging device 40, respectively. The measuring unit 202 calculates a relative position and a relative posture of the imaging device coordinate system and the workpiece coordinate system as the position and posture of the workpiece.

Figure 3:
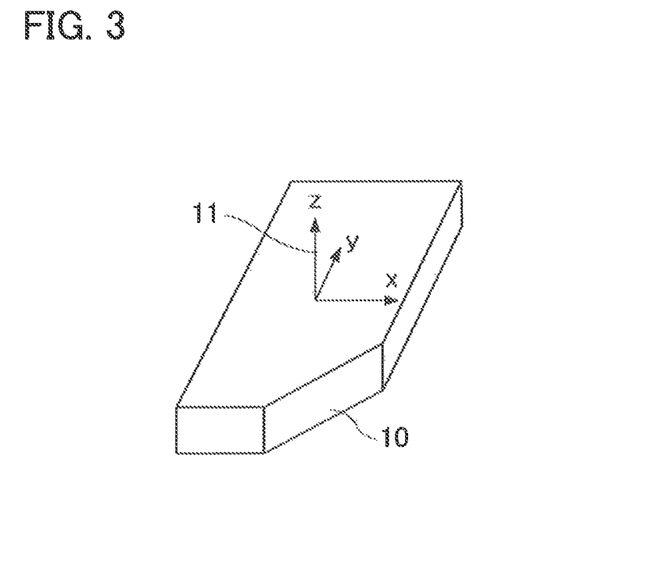
FIG. 3 is a diagram which shows a workpiece to be picked.

FIG. 3 is a diagram which shows the workpiece 10 to be picked and the workpiece coordinate system 11. The workpiece coordinate system 11 is a coordinate system set for the workpiece 10 detected as a gripping target. In the present embodiment, an XY plane constituted by an X axis and a Y axis is set on a plane having the widest area of the workpiece 10, and the Y axis is set parallel to the longest side of the sides of the workpiece 10. In addition, a Z axis is set to perpendicularly intersect the XY plane. The shape of the workpiece 10 and the setting of the workpiece coordinate system 11 are not limited to those shown in FIG. 3.

The specifying unit 203 specifies an area in which interference is of concern when the recognized workpiece is gripped as an attention area, and determines whether the specified attention area is included within an acquired image, that is, whether the attention area is included in an imaging range. This determination is performed to determine whether an image necessary for interference determination has been acquired. This is because the presence or absence of interference outside the measurement area cannot be determined if the attention area is not included in the measurement area of the imaging device 40, that is, if the attention area is outside the imaging range. The controller 204 sets the position and posture of the imaging device 40 and controls the imaging device 40. Therefore, the controller 204 functions as a change unit configured to change the imaging range when the imaging device 40 captures an image, and to set the position and posture of the imaging device, and an imaging controller configured to control the imaging device 40. If it is determined that the attention area specified by the specifying unit 203 is not included within the acquired image, the position and posture of the imaging device 40 for newly imaging the attention area that is outside of the captured image are set, and the imaging device 40 is moved to capture an image. The position and posture to be decided may be a position and a posture at which all of the attention area is included within the acquired image, or may be a position and a posture in which only the attention area outside of the image can be imaged.

The interference determination unit 205 performs interference determination on whether the robot hand 30 interferes with objects near the workpiece 10 to be gripped when the workpiece 10 is gripped. Objects near the workpiece 10 to be gripped such as workpieces, the pallet 20, and the like are included among the nearby objects subjected to interference determination. The interference determination unit 205 detects occurrence of interference by, specifically, detecting an overlap in space between three-dimensional point cloud data of the workpiece 10 and the pallet 20 obtained from a distance image obtained by imaging the bulk workpieces and the pallet 20 and an occupied area of the robot hand 30 when the detected workpiece 10 is gripped. A collision determination technique generally used in game programming and the like can be used in the overlap detection in space.

The storage unit 206 is a memory for storing necessary information such as a hand model or a relative position and relative posture. The robot controller 207 controls the robot hand 30 and the robot arm 31 to grip the workpiece 10 or to move the imaging device 40. If the robot arm 31 has a controller, an output unit for outputting information necessary for controlling the robot arm 31 such as the position and posture of an object to be gripped may be provided instead of the robot controller 207.

Figure 4:
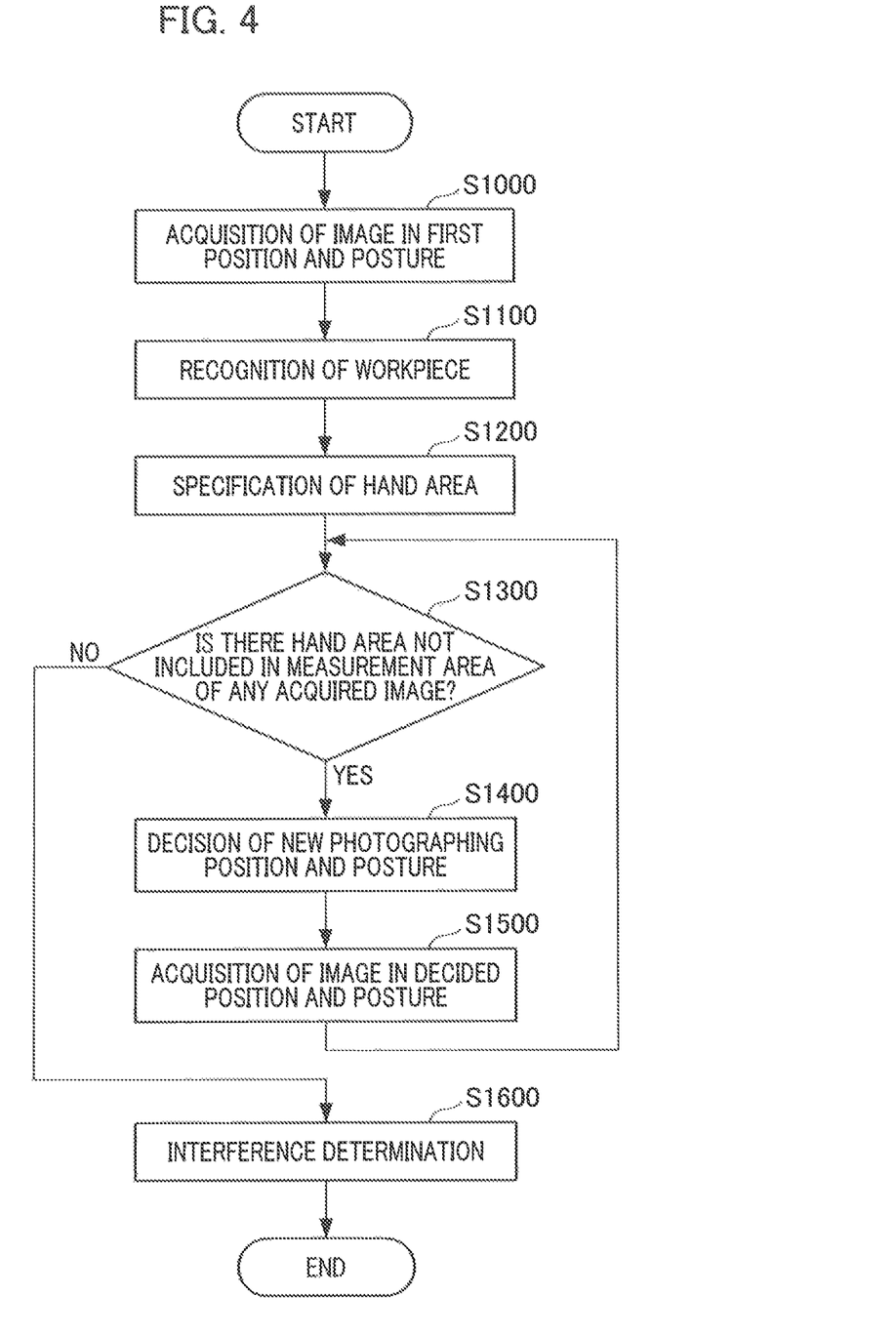
FIG. 4 is a flowchart which shows the processing procedure of interference determination.

FIG. 4 is a flowchart which shows the processing procedure of interference determination in the information processing apparatus 1.

(Step S1000)

The image acquisition unit 201 acquires an image captured by the imaging device 40 in a first position and posture decided by the controller 204. At this time, the image acquired by the image acquisition unit 201 is a distance image and a gray-scale image. For measurement based on a distance image, a well-known method of imaging reflected light of laser light and slit light with which an object is irradiated using a camera and measuring a distance by triangulation can be used. In addition, a time-of-flight method using the time of flight of light, a method of calculating a distance from a captured image of a stereo camera by triangulation, and the like may also be used.

Figure 5A:
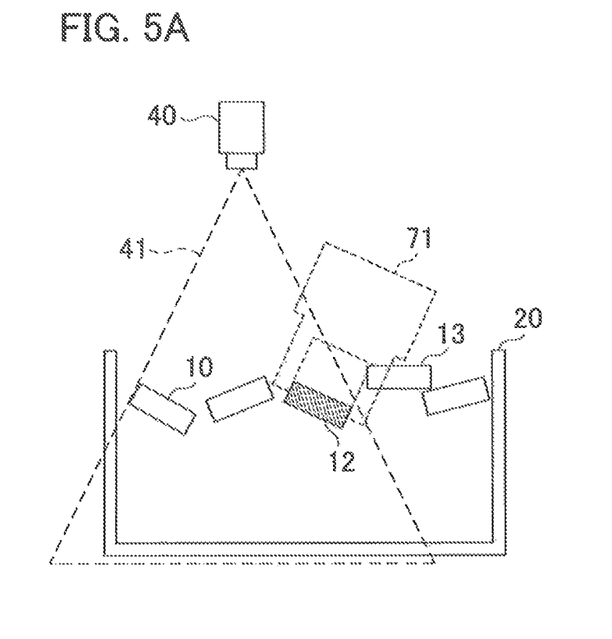
FIGS. 5A and 5B are diagrams which describe the position and posture of an imaging device 40 according to a first embodiment.
Figure 5B:
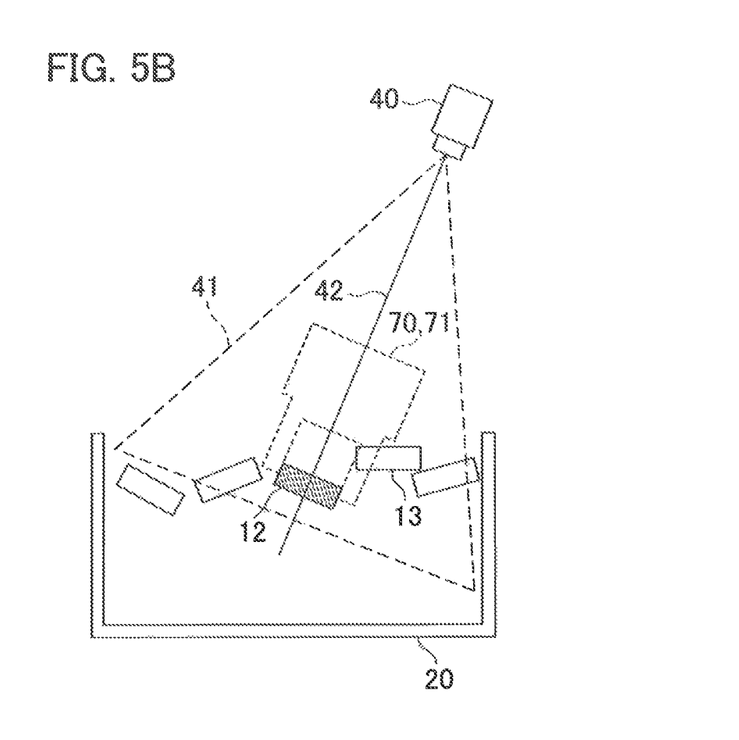

FIG. 5 is a diagram which describes the position and posture of the imaging device 40 according to the first embodiment. FIG. 5A is a diagram which shows the first position and posture. The first position and posture are appropriately decided by the controller 204 in consideration of the number of workpieces in the measurement area 41 of the imaging device 40 and the pallet 20 or a disposition situation. For example, if there are a large number of workpieces remaining, imaging is performed in a position and a posture in which observation is performed vertically downward from above the center of the pallet 20. In addition, the imaging device 40 may be moved into a plane parallel to the pallet bottom such that the workpieces at the end of the pallet can be measured if the number of workpieces is reduced. Alternatively, if a measurable depth range of the imaging device 40 is narrow, the imaging device 40 may be brought close to the pallet bottom such that the workpieces in the vicinity of the pallet bottom can be measured. In addition, as long as an image suitable for recognizing the workpieces can be captured, the first position and posture may be set to any position and posture.

In step S1000, as shown in FIG. 5A, the imaging device 40 is moved to the first position and posture and the image of the bulk workpieces 10 is captured. Imaging in a range (area) shown in the measurement area 41 is performed and measurement of the measurement area 41 is performed.

(Step S1100)

The measuring unit 202 detects one individual piece among the workpieces 10 included in the measurement area 41 using the gray-scale image and the distance image acquired in step S1000, and calculates the position and posture thereof. In FIG. 5A, the recognized workpiece is indicated by oblique lines. This workpiece detected as a gripping target is referred to as a "gripping target workpiece 12." A method of calculating positions and postures of the bulk workpieces using a gray-scale image and a distance image is well known, and thus specific description will be omitted herein. Only the gray-scale image may be used or only the distance image may be used to recognize the workpiece. In addition, the position and posture of only the gripping target workpiece 12 may be calculated after the gripping target workpiece 12 is decided, or the position and posture of the plurality of workpieces 10 in an image may be calculated and the gripping target workpiece 12 may be decided on the basis of a result of this calculation.

(Step S1200)

Figure 6A:
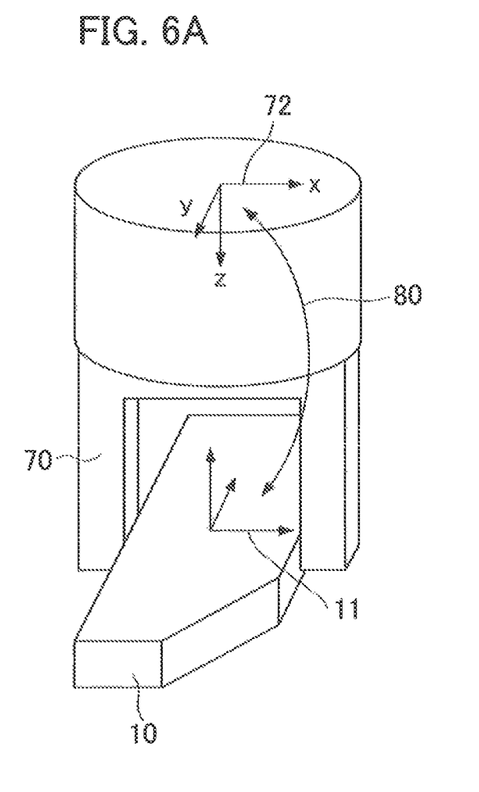
FIGS. 6A and 6B are diagrams which describe the setting of an attention area (attention area).
Figure 6B:
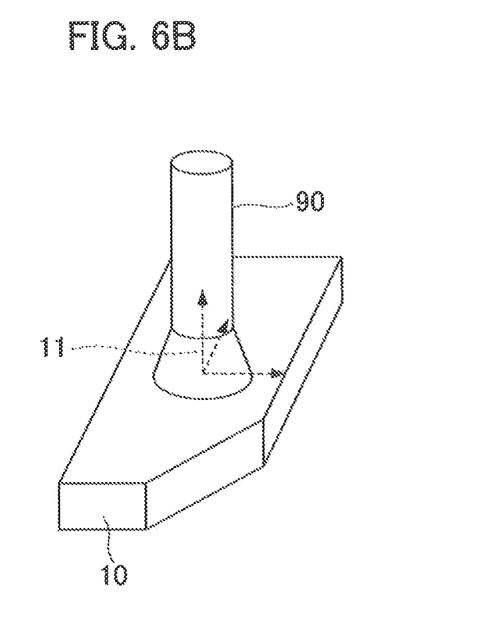

The specifying unit 203 specifies an area in which interference with the robot hand 30 is of concern when the gripping target workpiece 12 is gripped as an attention area. Decision of the attention area will be described using FIGS. 5A, 6A, and 6B. FIG. 6 is a diagram which describes setting of the attention area.

First, a method of disposing a hand model on the basis of the relative position and relative posture of the hand coordinate system 72 and the workpiece coordinate system 11 stored in the storage unit 206 in advance and specifying an attention area will be described using FIG. 6A. FIG. 6A is a diagram which shows a disposition relationship between a hand model 70 and a workpiece 10 when the workpiece 10 is gripped. FIG. 6A shows a disposition relationship between the hand model 70 and the workpiece 10 when the workpiece 10 is gripped by the robot hand 30. An attention area in the present embodiment is an occupied area of the robot hand 30 when the gripping target workpiece 12 is gripped. The attention area is specified by using the hand model 70 representing a three-dimensional shape of the robot hand 30, and a relative relationship between the hand model 70 and the workpiece 10 when gripping is performed. The information processing apparatus 1 stores the relative position and relative posture when the workpieces 10 of a unique coordinate system (hand coordinate system 72) set in the hand model of the storage unit 206 and the workpiece coordinate system 11 are gripped. Then, as shown in FIG. 5A, the hand model 70 is disposed on the basis of the stored relative position and relative posture with respect to the gripping target workpiece 12, and specifies an area in which the hand model 70 is disposed as an attention area 71 in the bulk space.

For the hand model 70, a polygon model may be used, or a model in which primitive shapes such as cylinders or rectangular parallelepipeds are combined may be used. In addition, the form of a hand-shape model is not particularly limited as long as the hand-shape model is a three-dimensional shape model which can specify a determination area per interference determination. For the hand model 70, a model modeled together with an area in which interference is of concern as well as a hand when the workpiece 10 is gripped may also be used. For example, the model may include the shape of the imaging device 40 attached to the hand or may include a portion of the arm tip to which the hand is attached. Moreover, if it is intended to determine presence or absence of interference in an approach operation of the hand up to the position and posture of the grip state or in an opening or closing operation of the finger of the hand, the hand model 70 modeled to include an area occupied by the hand along the trajectory of each operation may also be used.

Next, a method of directly storing an attention area 90 for the workpiece 10 in the workpiece coordinate system 11 in the storage unit 206 in advance and specifying the attention area will be described using FIG. 6B. FIG. 6B is a diagram which shows a disposition relationship between a workpiece 10 and the attention area 90 when the workpiece 10 is gripped. In FIG. 6B, the robot hand 30 which grips a center of the main plane of the workpiece 10 using an adsorption hand is adopted as an example of the robot hand 30. The information processing apparatus 1 grips the area occupied by the robot hand 30 at the time of gripping the center of the main plane of the workpiece 10 using an adsorption hand converted in advance into an expression based on the workpiece coordinate system 11 as the attention area 90. As a result, it is possible to specify the attention area 90 on the basis of the position and posture of the recognized workpiece 10 without performing coordinate conversion using the relative position and posture of the hand coordinate system 72 and the workpiece coordinate system 11.

(Step S1300)

The specifying unit 203 determines presence or absence of an interrupted view of the attention area 71 with respect to the measurement area 41 of a captured image. This will be described in detail using FIG. 5A. In the measurement area 41, no interference occurs between the hand model 70 that grips the gripping target workpiece 12 and nearby objects. However, interference occurs between the hand model 70 and an interference workpiece 13 outside the measurement area 41. However, since this interference occurs outside the measurement area 41, it cannot be detected by interference determination using the imaged distance image. It is necessary to capture and acquire a new image including a portion of the hand model 70 not included in the measurement area 41.

In step S1300, if it is determined that there is no interrupted view, that is, if all of the attention area 71 (that is, the hand model 70) is included in the space of the measurement area 41, it is possible to determine presence or absence of interference using a captured image, and thus the procedure proceeds to step S1600. On the other hand, if it is determined that there is an interrupted view, that is, if all of the attention area 71 is not included in the space of the measurement area 41, it is not possible to determine presence or absence of interference only with a captured image, and thus the procedure proceeds to step S1400 to capture and acquire an image including an area which is out of the image. In the present embodiment, it is determined that there is no interrupted view in determination of the presence or absence of an interrupted view if all of the occupied area of the hand model 70 is included in the space of the measurement area 41. However, the present embodiment is not limited thereto, and, for example, it may be determined that there is no interrupted view if a proportion of the occupied area of the hand model 70 included in the space of the measurement area 41 is higher than a threshold value (for example, 95 percent).

(Step S1400)

The controller 204 decides to change the imaging range of the imaging device 40 to an imaging range in which an image including the attention area 71 which is out of the image can be captured, and decides the second position and posture as a new position and posture of the imaging device 40. At this time, the controller 204 decides to change the imaging range to include an area of 80% or more (more desirably 90% or more) of the entire attention area 71 by combining an imaging range before the change and an imaging range after the change. The controller 204 may change the imaging range of the imaging device 40 to an imaging range in which an image including the entire area of the attention area 71 can be captured. In addition, in the present embodiment, the new position and posture are decided such that an approaching direction of the robot hand 30 coincides with the optical axis of the imaging device 40 when the robot hand 30 grips the workpiece 10. In this manner, a distance image suitable for interference determination can be captured by capturing the attention area 71 at the center of the image and observing the bulk workpieces 10 in the approach direction of the robot hand 30. For example, when the workpiece 10 is gripped, the robot hand 30 moves in a positive direction of a Z axis of the hand coordinate system 72 and approaches the workpiece 10 to be gripped to perform gripping in FIG. 6A. More specifically, the robot hand 30 performs approach such that positive directions of a Z axis of the workpiece coordinate system 11 and the Z axis of the hand coordinate system 72 are close to each other in parallel. The Z axis of the hand coordinate system 72 is a central axis of the hand model 70.

FIG. 5B is a diagram which shows a second position and posture. All of the attention area 71 is included in the measurement area 41 in the second position and posture in FIG. 5B. However, the present invention is not limited thereto, and since all of the attention area 71 and an acquired image in the first position and posture may be measured, a position and a posture in which only an area outside of imaging in the first position and posture can be imaged may be set as the second position and posture.

As shown in FIG. 5B, the controller 204 decides the second position and posture such that an approach direction of the hand, that is, the Z axis of the hand coordinate system 72, coincides with the optical axis 42 of the imaging device 40. At this time, when the hand model 70 is projected onto a captured image surface, it is desirable to have a posture in which transverse and longitudinal directions in the X axis and Y axis of the captured image coincide with transverse and longitudinal directions in the X axis and Y axis of the hand coordinate system 72 to include the hand model 70 within an image area. For example, the posture of the imaging device 40 about the optical axis 42 decides the second position and posture such that an X axis of the coordinate system of the imaging device 40 coincides with an X axis of the hand coordinate system 72. In addition, the position of the imaging device 40 in a direction of the optical axis 42 is set such that, for example, the hand model 70 is positioned at the center of a depth range of the imaging device 40 in which the distance measurement is possible. Alternatively, a farthest surface of the depth range in which the distance measurement is possible may be set to coincide with a farthest surface of the hand model 70 in the direction of the Z axis. With regard to the decision of the second position and posture, a posture and a position in a direction of the optical axis around the optical axis of the imaging device 40 after the approach direction of the robot hand 30 coincides with the optical axis 42 of the imaging device 40 may also be decided by other methods. Any method can be used as long as the measurement area 41 can be decided to sufficiently include the attention area 71 which is not imaged.

(Step S1500)

The controller 204 moves the imaging device 40 to the second position and posture decided in step S1400, and captures a new image in the changed imaging range. Then, the image acquisition unit 201 acquires an image captured in the second position and posture. Since the image captured in step S1500 is used for interference determination, only a distance image is acquired. However, a gray-scale image may also be acquired together. As shown in FIG. 5B, it is possible to capture an image including the interference workpiece 13 which is outside the measurement area in FIG. 5A by the imaging device 40 performing imaging from the second position and posture. After the image is captured in the second position and posture, the procedure returns to step S1300.

In step S1300 after the image captured in the second position and posture in step S1500 is acquired, it is determined whether the attention area 71 is outside of the measurement area 41 of any of images captured in each position and posture. If the attention area 71 is included in the measurement area 41 of a captured image, interference determination is possible using the captured image, and thus the procedure proceeds to step S1600. On the other hand, if there is an attention area 71 not included in any captured image, determination of the presence or absence of interference with respect to the attention area 71 which is outside of any captured image is not possible. Therefore, the procedure proceeds to step S1400 to capture an image covering the attention area 71 which is outside of the image.

(Step S1600)

The interference determination unit 205 determines the presence or absence of interference between the robot hand 30 gripping the gripping target workpiece 12 and nearby objects using each distance image captured in step S1000 and step S1500. Specifically, first, a minute sphere of a radius R is disposed at the position of each measurement point of a three-dimensional point group obtained from the captured distance image. Then, interference determination is performed by detecting spatial overlapping between the sphere disposed based on each measurement point and the occupied area of the robot hand 30. If a polygon model is used as the hand model 70, it is determined that there is interference if there is overlapping between the sphere and the polygon constituting the hand model 70, and it is determined that there is no interference if there is no overlapping. For a method of determining interference between the polygon and the sphere, a well-known method can be used. The three-dimensional point group obtained from the distance image includes the measurement point of the gripping target workpiece 12 itself. In order not to incorrectly detect interference by the measurement point from the gripping target workpiece 12, interference determination may be performed by excluding the corresponding measurement point. In addition, interference determination can be performed by other methods. For example, a polygon model expressing three-dimensional shape data of the bulk workpieces is generated by concatenating three-dimensional points between adjacent pixels of the distance image, and interference determination may also be executed by detecting an intersection between polygons with each polygon constituting the hand model 70. In this case, if there is an intersection between polygons, it is determined that there is interference, and if not, it is determined that there is no interference. As a method of determining interference between polygons, a well-known method can be used. As mentioned above, the hand model 70 can also use a model expressing a three-dimensional shape by combination of simple primitive shapes such as cylinders, rectangular parallelepipeds, spheres, and the like. In this case, it is possible to determine the presence or absence of interference by detecting the overlapping between each primitive shape constituting the hand model 70 and the sphere or polygon generated from the measurement point group. In addition, the interference determination can be performed by any method as long as it is a method that can detect spatial overlapping between the area occupied by the robot hand 30 expressed by the hand model 70 and the three-dimensional shape data of the bulk workpieces 10 and the pallet 20 generated from the captured distance image. For example, the interference determination may be performed using a plurality of distance images, and may also be performed using only a distance image captured in the second position and posture.

The interference determination unit 205 performs interference determination on each captured distance image. If it is determined that there is interference in any distance image, since interference occurs when the gripping target workpiece 12 is gripped, it is determined that gripping is impossible. On the other hand, if there is no interference in any distance image, it is determined that the gripping target workpiece 12 can be gripped without interference. If all of the attention area 71 is included in one captured image, interference determination may be performed using only the image.

In the present embodiment, in determination of the presence or absence of an interrupted view in step S1300, it is determined whether all of the area occupied by the hand model 70 is included in a measurement area as the attention area 71. However, if it is assured that the bulk workpieces 10 do not exceed a height of the top surface of the pallet 20 and there is no object in which interference is of concern above the pallet 20, it is not necessary to perform interference determination because it is assumed that there is no interference at a position higher than the top surface of the pallet 20. That is, the interference determination may be performed on only a portion of the area occupied by the hand model 70 in a space in which the bulk workpieces 10 are accommodated in the pallet 20. Therefore, an overlap area between the area occupied by the hand model 70 specified in step S1200 and the space in which the bulk workpieces 10 are present may be specified as the attention area 71. As a result, it is possible to determine the presence or absence of an interrupted view by limiting an area required for the interference determination.

In the present embodiment, the imaging device 40 is provided and attached to the robot hand 30 at the tip of the robot arm 31 which is an articulated robot. Although the imaging device 40 is moved by controlling the driving of these, if a camera can be moved to the decided position and posture, the camera and the robot may not be integrated. A single axis robot which can control a position or a posture may be used, and an orthogonal robot which can control a combination of these may also be used.

In addition, an image in the first position and posture for workpiece recognition and an image in the second position and posture for interference determination are captured using the same imaging device 40 in the present embodiment, but each image may be captured using different imaging devices. For example, an imaging device capable of observing an entire pallet in the first position and posture may be fixed, and only workpiece recognition may be performed using this imaging device. Then, for the interference determination, the second position and posture are detected by the method described in the present embodiment and an imaging device attached to a robot arm is moved to capture an image. As a result, it is possible to accurately execute the interference determination by additionally capturing an image suitable for the interference determination.

As described above, it is possible to accurately determine whether there is interference between a robot hand and nearby objects by newly a deciding position and posture of an imaging device capable of capturing an image suitable for interference determination, and performing image capturing after a workpiece to be gripped is recognized from the bulk workpieces in the present embodiment.

Second Embodiment

In the first embodiment, in step S1400, a posture in which an approach direction of the robot hand 30 in a grip operation coincides with the optical axis 42 of the imaging device 40 is decided as a second position and posture. In contrast, a posture in which an attention area is observed from above the center of the pallet 20 is used as the second position and posture in the present embodiment. The present embodiment is particularly effective in the case of determining presence or absence of interference in the vicinity of a pallet side when there are few workpieces in the pallet.

Figure 7A:
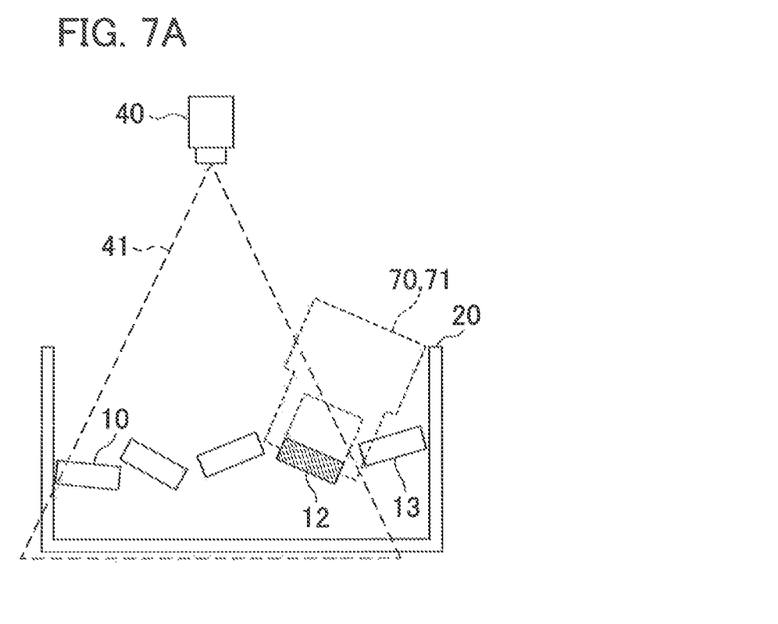
FIGS. 7A and 7B are diagrams which describe the position and posture of an imaging device 40 according to a second embodiment.
Figure 7B:
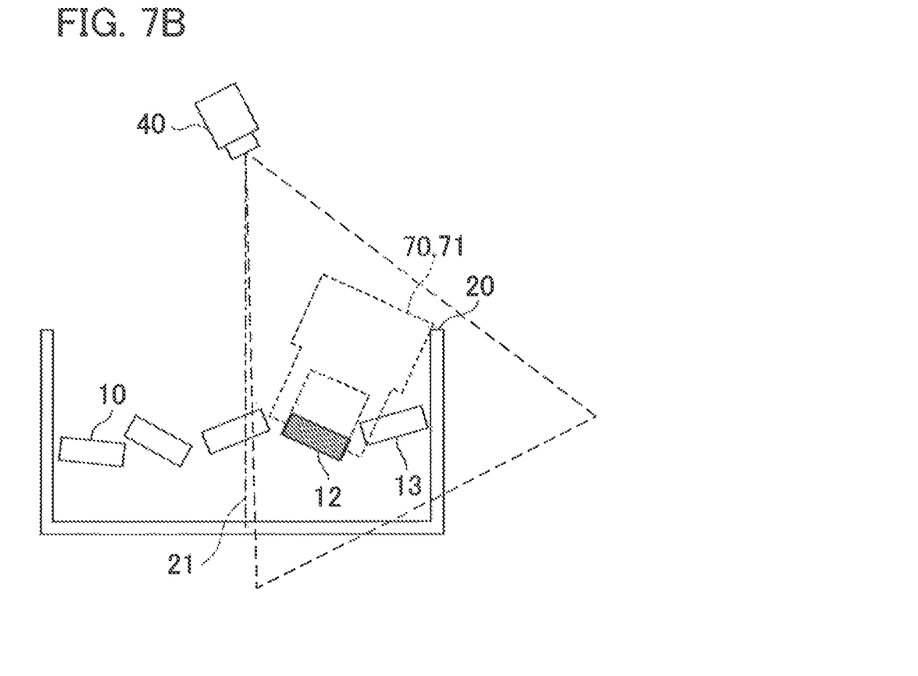

FIG. 7 is a diagram which describes the position and posture of the imaging device 40 according to a second embodiment. FIG. 7A is a diagram which shows the first position and posture of the imaging device 40, and FIG. 7B is a diagram which shows the second position and posture of the imaging device 40. First, the imaging device 40 captures images in the first position and posture as shown in FIG. 7A in step S1000, and recognizes a gripping target workpiece 12 in step S1100. Here, in a situation in which there are few workpieces in the pallet as shown in FIG. 7A, if the imaging position and posture are decided in the same manner as in the first embodiment, they may be concealed in the side portion of the pallet and the distance measurement of the interference workpiece 13 may not be possible.

Therefore, the second position and posture are decided in step S1400, and as shown in FIG. 7B, the second position and posture are decided such that the attention area 71 is observed from above the center of the pallet 20. As a result, a possibility of the interference workpiece 13 being concealed by the pallet 20 is avoided. Specifically, the second position and posture are decided such that the origin of the coordinate system of the imaging device 40 passes through a pallet central axis 21, and the center of the attention area 71 is positioned at the center of the measurement area 41 of the imaging device 40.

A height of the imaging device 40 on the pallet central axis 21 is set to a height which facilitates measurement of the inside of the pallet 20 in advance. Alternatively, in the same manner as in the first embodiment, the height of the imaging device 40 may be appropriately decided such that the attention area 71 is positioned at the center of the depth range in which distance measurement is possible in the imaging device 40. Moreover, the posture around the optical axis is set to a posture such that transverse and longitudinal directions of a captured image coincide with longitudinal and transverse directions when an attention area on the surface of a captured image is projected. As a result, since it is possible to observe the bulk shape around the gripping target workpiece 12 without concealment by the pallet 20, interference determination can be performed with high accuracy. Moreover, the second position and posture may be switched by the decision method of the first embodiment and the present embodiment in accordance with the amount, height, or the like of the bulk workpieces in the pallet 20.

As described above, since the second position and posture are decided such that the attention area 71 is observed from above the center of the pallet 20, it is possible to accurately perform interference determination without the pallet 20 concealing the workpiece 10 in imaging from the second position and posture in the present embodiment.

Third Embodiment

In the first embodiment, the interference determination unit 205 reproduces the three-dimensional shape around a workpiece to be gripped using a three-dimensional point group obtained from a distance image acquired by the imaging device 40 and executes interference determination. On the other hand, in the present embodiment, interference determination is performed on the basis of a captured image without using a distance image. For example, only a gray-scale image is acquired and nearby workpieces other than the workpiece to be gripped are also detected from each acquired gray-scale image in step S1000 and step S1500. Then, the interference determination is performed by detecting overlapping between the detected workpieces 10 and the hand model 70 gripping the gripping target workpiece 12. Specifically, a workpiece model representing the three-dimensional shape of the workpiece 10 is disposed in the position and posture of each detected workpiece 10, and spatial overlapping between the area occupied by the workpiece model and the area (for example, the attention area 71) occupied by the hand model 70 gripping the workpiece to be gripped is detected. If the overlapping is detected, it is determined that there is interference, and if the overlapping is not detected, it is determined that there is no interference.

In the present embodiment, a distance image is not necessary for interference determination, and a captured image may be only an acquired gray-scale image if the workpiece to be gripped and nearby workpieces are recognized. If the distance image is not necessary, a projection unit configured to project a slit required for imaging the distance image becomes unnecessary and the apparatus can be simplified.

Fourth Embodiment

In the first embodiment, it is determined whether all of the occupied area of the hand model 70 is included in the space of the measurement area 41 in the determination of an interrupted view in step S1300 using three-dimensional information. In the present embodiment, the determination of an interrupted view is performed using two-dimensional information which enables a faster operation. Since a basic processing flow of the present embodiment is the same as that of the first embodiment, only step S1200 and step S1300 which differ in processing will be described here.

(Step S1200)

The specifying unit 203 specifies an area in which interference is of concern when the gripping target workpiece 12 is gripped as the attention area 71. In the present embodiment, the attention area 71 is specified by projecting the area occupied by the hand model 70 onto a captured image. Specification of the attention area 71 in the present embodiment will be described using FIG. 8. FIG. 8 is a diagram which shows a method of specifying a captured image and an attention area.

Figure 8A:
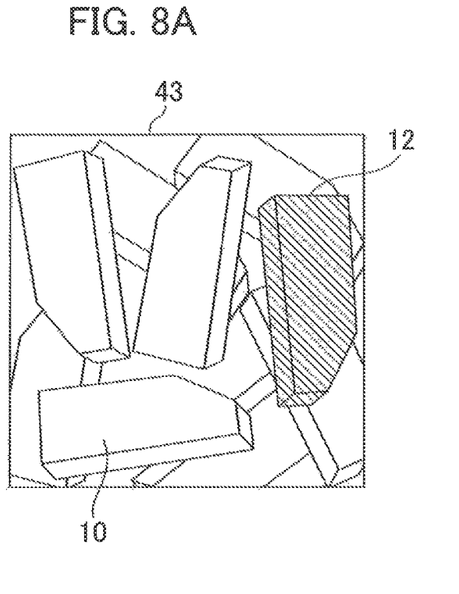
FIGS. 8A to 8D are diagrams which show a method of specifying a captured image and an attention area.
Figure 8B:
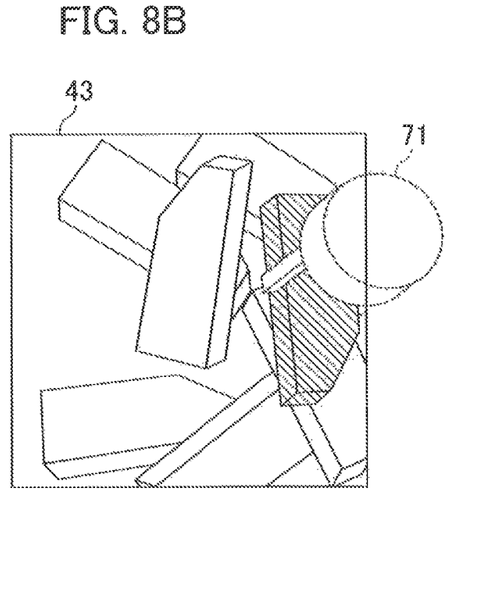

FIG. 8A is a captured image 43 acquired in step S1000. In step S1100, the gripping target workpiece 12 is recognized as a gripping target among the bulk workpieces 10 in step S1100. In the present embodiment, the hand model 70 is disposed at a position at which the gripping target workpiece 12 is gripped, and the disposed hand model 70 is projected onto a captured image 43 as shown in FIG. 8B. FIG. 8B is a diagram in which the hand model 70 is projected onto the captured image 43. Then, the specifying unit 203 sets an image area onto which the hand model 70 is projected as the attention area 71.

(Step S1300)

The specifying unit 203 determines the presence or absence of an interrupted view of an attention area with respect to the measurement area of a captured image. In the present embodiment, if the attention area 71 is included within an image range of the captured image 43, it is determined that there is no interrupted view. On the other hand, if the attention area 71 is not included within the image range of the captured image 43, it is determined that there is an interrupted view. In an example of FIG. 8B, since there is the attention area 71 protruding outside of a range of the captured image 43, it is determined that there is an interrupted view. On the other hand, for example, since the attention area 71 is included in the captured image 43 according to a state of FIG. 8C, it is determined that there is no interrupted view.

As described above, since presence or absence of an interrupted view is determined using two-dimensional information by projecting a hand model onto an image in the present embodiment, processing can be performed at high speed.

Fifth Embodiment

In the first embodiment, a method of attaching the imaging device 40 to the robot hand 30 at the tip of the robot arm 31 which is a vertically articulated robot that can arbitrarily control a position and a posture, and performing interference determination of bulk picking has been described. In the present embodiment, a method of attaching the imaging device 40 to a three-axis slider which can control only positions in the XYZ directions and performing the interference determination of bulk picking will be described below. The imaging device 40 attached to the three-axis slider can translate with three degrees of freedom by the slider. Here, it is assumed that the imaging device 40 is attached such that the three controllable directions of the slider coincide with vertical and transverse height directions of the pallet and the three controllable directions of the slider coincide with a direction of each axis of the imaging device coordinate system. However, a method of installing the slider and a method of attaching the imaging device 40 are not limited thereto, and any methods may be used.

Since the imaging device 40 in the present embodiment is attached to a three-axis slider, positions to move to and possible postures are limited. Therefore, setting of the second position and posture in step S1400 in the present embodiment will be described.

(Step S1400)

Figure 8C:
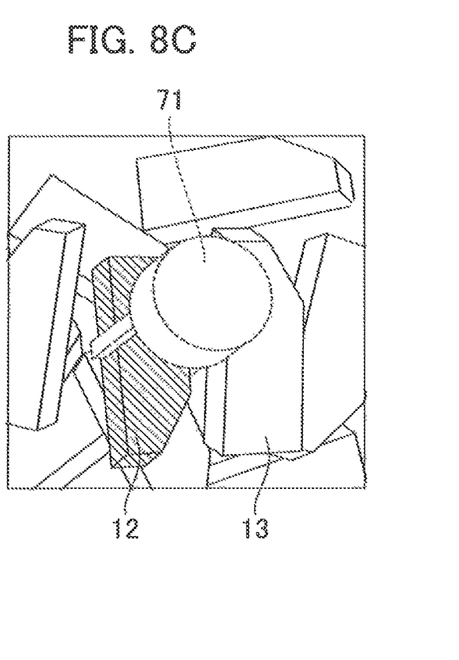

The controller 204 decides the second position and posture as a new position and posture in which an image including an attention area which is out of view can be captured. In the present embodiment, since the posture of the imaging device 40 cannot be changed, only an imaging position is decided. Specifically, as shown in FIG. 8C, the imaging position is decided such that the center position of the attention area 71 indicated by a shaded area becomes a center of a captured image. The imaging position may be decided by any other method as long as the attention area 71 is captured as an image center in the method such as using a center of the circumscribed rectangle of the attention area 71 instead of a center position of the attention area 71. In addition, the imaging position may be decided with reference to the center position of the entire attention area 71 in the present embodiment, but the imaging position may also be decided with reference to the center position of an out-of-view area within the attention area 71.

Figure 9:
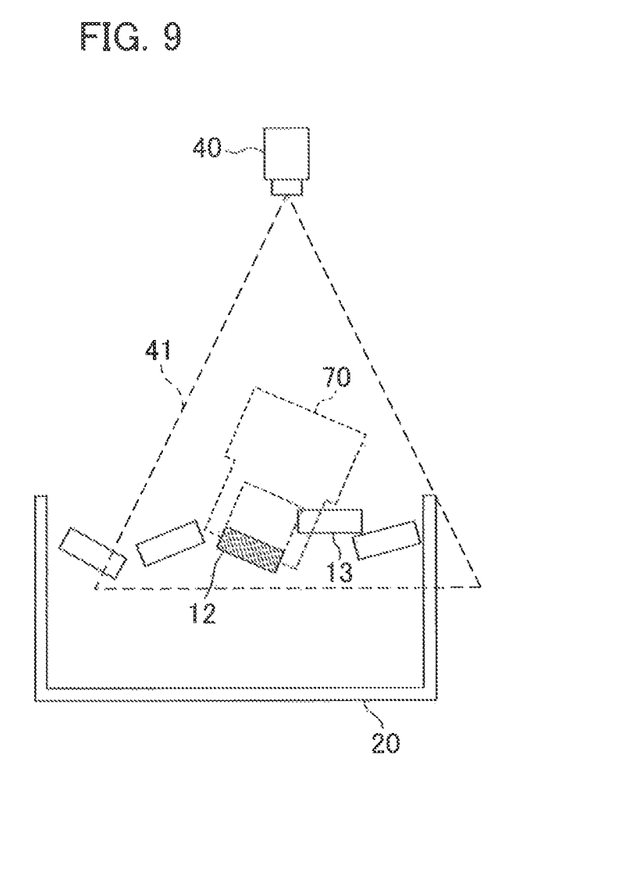
FIG. 9 is a diagram which describes the position and posture of an imaging device according to a fifth embodiment.

A position of the imaging device 40 in the direction of an optical axis is set, as in the first embodiment, such that the hand model 70 is positioned at the center of a depth range in which distance measurement is possible in the imaging device 40. Alternatively, a farthest surface of the depth range in which distance measurement is possible may coincide with a farthest surface of the hand model 70 in the Z axis direction. According to the present embodiment, for example, it is possible to set the second position and posture shown in FIG. 9 in step S1400 after capturing an image in the first position and posture shown in FIG. 5A. FIG. 9 is a diagram which describes the position and posture of an imaging device 40 according to the fifth embodiment.

Figure 8D:
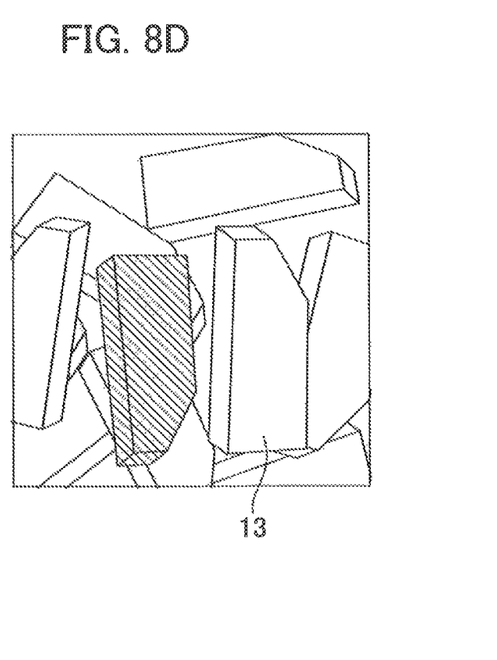

In step S1500, a captured image is obtained as shown in FIG. 8(D) by moving the imaging device 40 to the second position and posture set in step S1400 and capturing an image. As a result, the interference workpiece 13 which is outside of imaging in the first position and posture can be observed and presence or absence of interference with the hand model 70 can be determined with high accuracy.

An example in which the imaging device 40 is attached to the three-axis slider has been described above, but, for example, a slider that can translate along one axis or two axes may be used, and a device capable of rotation control may also be used. Moreover, in a vertical articulated robot, the present embodiment can be applied even to a case in which movement of the imaging device 40 is limited to only translation along three axes.

As described above, according to the present embodiment, it is possible to accurately perform interference determination of bulk picking even if the imaging device 40 is attached to a three-axis slider that can control only the positions in XYZ directions.

(Embodiment Concerning a Method of Manufacturing Articles)

The information processing apparatus according to the embodiments described above is used for a method of manufacturing articles. The method of manufacturing articles includes a process of performing measurement on an object (that is, a workpiece) using the information processing apparatus, and a process of processing the object on which measurement has been performed in the process. The processing may include, for example, at least one of processing, cutting, transportation, assembly (assembly), inspection, and selection. The method of manufacturing articles in the present embodiment is advantageous in at least one of performance, quality, productivity, and production cost of articles as compared with the conventional method.

Other Embodiments

The present invention can also be realized by processing of supplying a program for realizing one or more functions in the embodiments described above to a system or an apparatus via a network or a storage medium, and of one or more processors in a computer of the system or apparatus reading and executing the program. Furthermore, the present invention can be realized by a circuit (for example, ASIC) which realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-077728 filed on Apr. 10, 2017, which is hereby incorporated by reference herein in its entirety.

What is claimed is:

1. An information processing apparatus comprising:
    a decision unit configured to decide an object to be gripped by a gripping device among a plurality of objects on the basis of a first image obtained by capturing a first area including the plurality of objects;
    a specifying unit configured to specify an attention area including the gripping device when the gripping device grips the decided object to be gripped and to determine whether the specified attention area is included within the first image;
    a controller configured to obtain, when the specifying unit determines at least part of the specified attention area is not included within the first image, a second image obtained by capturing a second area including the specified attention area that is not included within the first image; and a determination unit configured to determine whether the gripping device brings into contact with an object other than the decided object to be gripped on the basis of the second image when the gripping device grips the decided object to be gripped.

2. The information processing apparatus according to claim 1, wherein the specifying unit is further configured to specify the second area.

3. The information processing apparatus according to claim 1, further comprising:

a changing unit configured to decide an imaging range using an imaging device when the specifying unit determines at least part of the specified attention area is not included within the first image.

4. The information processing apparatus according to claim 1, wherein the determination unit determines whether the gripping device brings into contact with the object other than the decided object to be gripped when the gripping device grips the decided object to be gripped on the basis of the first image and the second image.

5. The information processing apparatus according to claim 1, wherein the second image includes a plurality of images.

6. The information processing apparatus according to claim 2, further comprising:

a storage unit configured to store a three-dimensional shape model of the gripping device and relative position and relative posture of the decided object to be gripped and the gripping device when the decided object to be gripped is gripped, wherein the specifying unit specifies the second area with respect to the decided object to be gripped on the basis of the three-dimensional shape model and the relative position and the relative posture.

7. The information processing apparatus according to claim 2, further comprising:

a storage unit configured to store positions and postures of the decided object to be gripped, wherein the specifying unit specifies the second area on the basis of the positions and postures of the decided object to be gripped stored by the storage unit.

8. The information processing apparatus according to claim 2, wherein the specifying unit specifies the second area by projecting an area occupied by the gripping device when the decided object to be gripped is gripped onto the first image.

9. A measuring apparatus that performs measurement of a position and a posture of an object, the apparatus comprising:

an imaging device configured to image an object; and
an information processing apparatus,
wherein the information processing apparatus includes:
a decision unit configured to decide an object to be gripped by a gripping device among a plurality of objects on the basis of a first image of the imaged object obtained by capturing a first area;
a specifying unit configured to specify an attention area including the gripping device when the gripping device grips the decided object to be gripped and to determine whether the specified attention area is included within the first image;

a controller configured to obtain, when the specifying unit determines at least part of the specified attention area is not included within the first image, a second image obtained by capturing a second area including the specified attention area that is not included within the first image;
a determination unit configured to determine, when the gripping device grips the decided object to be gripped, whether the gripping device brings into contact with an object other than the decided object to be gripped on the basis of the second image; and
a measuring unit configured to measure a position and a posture of the decided object to be gripped on the basis of an image captured by the imaging device.

10. A system comprising:
a measuring apparatus configured to measure a position and a posture of an object; and
a gripping device configured to grip and move the object,
wherein the measuring apparatus includes an imaging device configured to image the object and an information processing apparatus,
wherein the information processing apparatus includes:
a decision unit configured to decide an object to be gripped by the gripping device among a plurality of objects on the basis of a first image of the imaged object obtained by capturing a first area;
a specifying unit configured to specify an attention area including the gripping device when the gripping device grips the decided object to be gripped and to determine whether the specified attention area is included within the first image;
a controller configured to obtain, when the specifying unit determines at least part of the specified attention area is not included within the first image, a second image obtained by capturing a second area including the specified attention area that is not included within the first image;
a determination unit configured to determine, when the gripping device grips the decided object to be gripped, whether the gripping device brings into contact with an object other than the decided object to be gripped on the basis of the second image; and
a measuring unit configured to measure a position and a posture of the decided object to be gripped on the basis of an image captured by the imaging device,
wherein the measuring apparatus outputs the position and posture of the decided object to be gripped to the gripping device if it is determined that the gripping device does not bring into contact with an object other than the decided object to be gripped, and
wherein the gripping device grips the decided object to be gripped on the basis of the output position and posture of the decided object to be gripped.

11. A determination method for determining whether a gripping device brings into contact with an object other than a decided object to be gripped when the decided object to be gripped is gripped, the method comprising:
deciding the object to be gripped by the gripping device among a plurality of objects on the basis of a first image obtained by capturing a first area including the plurality of objects;
specifying an attention area including the gripping device when the gripping device grips the decided object to be gripped and determining whether the specified attention area is included within the first image;
obtaining, when it is determined that at least part of the specified attention area is not included within the first image, a second image obtained by capturing a second area including the specified attention area that is not included within the first image; and determining, when the gripping device grips the decided object to be gripped, whether the gripping device brings into contact with an object other than the decided object to be gripped on the basis of the second image.

12. A method for manufacturing an article, the method comprising:

measuring a plurality of objects;

determining whether a gripping device brings into contact with an object other than a decided object to be gripped when the decided object to be gripped is gripped using an information processing apparatus; and processing the decided object to be gripped on the basis of a result of the determination, wherein the information processing apparatus includes:

a decision unit configured to decide the object to be gripped by the gripping device among the plurality of objects on the basis of a first image of imaged objects obtained by capturing a first area;

a specifying unit configured to specify an attention area including the gripping device when the gripping device grips the decided object to be gripped and to determine whether the specified attention area is included within the first image;

a controller configured to obtain, when the specifying unit determines at least part of the specified attention area is not included within the first image, a second image obtained by capturing a second area including the specified attention area that is not included within the first image; and a determination unit configured to determine, when the gripping device grips the decided object to be gripped, whether the gripping device brings into contact with an object other than the decided object to be gripped on the basis of the second image.

* * * * *